US008478774B2

(12) United States Patent
Ariga (10) Patent No.: US 8,478,774 B2
(45) Date of Patent: Jul. 2, 2013

(54) INFORMATION PROCESSING APPARATUS

(75) Inventor: Toshio Ariga, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 151 days.

(21) Appl. No.: 12/469,891

(22) Filed: May 21, 2009

(65) Prior Publication Data

US 2010/0146439 A1 Jun. 10, 2010

(30) Foreign Application Priority Data

Dec. 4, 2008 (JP) .............................. P2008-309710

(51) Int. Cl.
 G06F 7/00 (2006.01)
 G06F 17/30 (2006.01)
(52) U.S. Cl.
 USPC ........................................................ 707/767
(58) Field of Classification Search
 USPC ........................... 707/769, 713, 767, 999.004
 See application file for complete search history.

(56) References Cited

U.S. PATENT DOCUMENTS

| | | | | |
|---|---|---|---|---|
| 4,864,501 A | * | 9/1989 | Kucera et al. | 704/8 |
| 5,574,840 A | * | 11/1996 | Kwatinetz et al. | 715/272 |
| 6,601,059 B1 | * | 7/2003 | Fries | 1/1 |
| 7,725,476 B2 | * | 5/2010 | Waggoner | 707/758 |
| 2002/0188603 A1 | * | 12/2002 | Baird et al. | 707/3 |
| 2003/0145285 A1 | * | 7/2003 | Miyahira et al. | 715/533 |
| 2006/0224586 A1 | * | 10/2006 | Pickover et al. | 707/6 |
| 2007/0088687 A1 | * | 4/2007 | Bromm et al. | 707/4 |
| 2007/0233692 A1 | * | 10/2007 | Lisa et al. | 707/10 |
| 2007/0288451 A1 | * | 12/2007 | Meyer et al. | 707/5 |
| 2008/0244388 A1 | * | 10/2008 | Fux et al. | 715/257 |

FOREIGN PATENT DOCUMENTS

JP 2008-117161 A 5/2008

* cited by examiner

Primary Examiner — Alexey Shmatov
(74) Attorney, Agent, or Firm — Maschoff Brennan (57) ABSTRACT

An information processing apparatus which includes a first reception module configured to acquire first information of a character string selected through an input module from character strings displayed on a display module, a candidate creation module configured to create a plurality of character strings relevant to the selected character string as candidates based on the first information and to display the candidates on the display module, a second reception module configured to acquire second information of a character string determined through the input module from the candidates, and a retrieval module. The retrieval module is configured to receive the second information from the second reception module, perform information retrieval based on the second information, and display a result of the information retrieval on the display module.

14 Claims, 10 Drawing Sheets

| SUBJECT NAME | AS FOR ○○ |
| SENDER | Mr. △△ |
| DATE AND TIME OF RECEIPT | ○ (MONTH) × (DAY) △ (HOUR) : □ (MINUTE) |

IT IS POSSIBLE TO DO AN OPERATION WITH YOUR
FINGER AS WELL AS ...
FOR EXAMPLE, A MOBILE PHONE OF A TYPE EMPLOYING
A PRESSURE-SENSITIVE TOUCH PANEL HAS APPEARED AS A
RECENT MOBILE PHONE.

INFORMATION PROCESSING APPARATUS

CROSS-REFERENCE TO RELATED APPLICATIONS

The entire disclosure of Japanese Patent Application No. 2008-309710 filed on Dec. 4, 2008, including specification, claims, drawings and abstract is incorporated herein by reference in its entirety.

BACKGROUND

1. Field of the Invention

One aspect of the invention relates to an information processing apparatus for performing information retrieval based on information of a selected character string.

2. Description of the Related Art

As this type information retrieval technique, there is disclosed a technique in JP-A-2008-117161.

The relevant site search program disclosed in JP-A-2008-117161 is a program for operating a computer connected to the Internet or Intranet to serve as a computer which at least includes: a character string selection unit which selects one from character strings displayed on a display module; a retrieval unit which retrieves relevant sites based on information of the selected character string; and a relevant site information output unit which displays information concerned with the relevant sites on the display module.

The character string selection unit has a mouse monitoring unit which monitors a click button operation and a dragging operation of a mouse. Hence, according to the technique disclosed in JP-A-2008-117161, a user can select an arbitrary character string from character strings (text sentences, etc.) displayed on a display module such as a monitor by operating the mouse and can search for relevant sites easily based on the selected character string.

A smaller-size apparatus has been recently developed as a portable information processing apparatus such as a mobile phone, a Portable Digital Assistant (PDA), etc. For example, some portable information processing apparatus employs such a touch panel that an input device and a display device are integrated with each other to thereby reduce the total size of the information processing apparatus. In most cases, the display device built in this type portable information processing apparatus is smaller than the display device provided in a stationary information processing apparatus such as a desktop personal computer, etc.

In the background art, however, there is no consideration about the case where a partial character string is selected from character strings displayed on this type small display device. For this reason, the portable information processing apparatus according to the related art is lacking in user-friendliness because the apparatus has a high possibility that the user will make a wrong operation at selection of a character string. When, for example, the related art is used, the user is forced to do a delicate operation of selecting a desired character string from character strings displayed on a small display device because the user has to use the small-size portable information processing apparatus for selecting such a desired character string. Particularly when the portable information processing apparatus employs a touch panel, the user has to do an operation of selecting such a desired character string by tracing one of character strings displayed on the small display device with a user's finger but it is difficult for the user to do the operation accurately because the size of a character is often smaller than the width of a user's fingertip.

SUMMARY

According to an aspect of the invention, there is provided an information processing apparatus including: a first reception module configured to acquire first information of a character string selected through an input module from character strings displayed on a display module; a candidate creation module configured to create a plurality of character strings relevant to the selected character string as candidates based on the first information and to display the candidates on the display module; a second reception module configured to acquire second information of a character string determined through the input module from the candidates; and a retrieval module configured to: receive the second information from the second reception module; perform information retrieval based on the second information, a and display a result of the information retrieval on the display module.

BRIEF DESCRIPTION OF THE DRAWINGS

Embodiment may be described in detail with reference to the accompanying drawings, in which.

DETAILED DESCRIPTION OF THE EMBODIMENTS

An embodiment of the invention as to an information processing apparatus will be described below with reference to the accompanying drawings. In the following description, a mobile phone with a touch panel will be taken as an example of the information processing apparatus according to the invention.

Figure 1A:
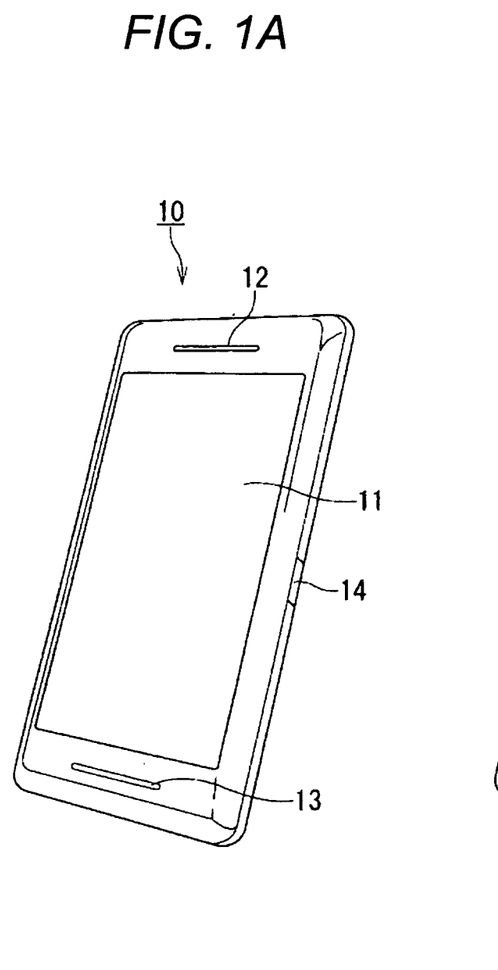
FIG. 1A is an exemplary front perspective view of a mobile phone according to an embodiment of the invention.
Figure 1B:
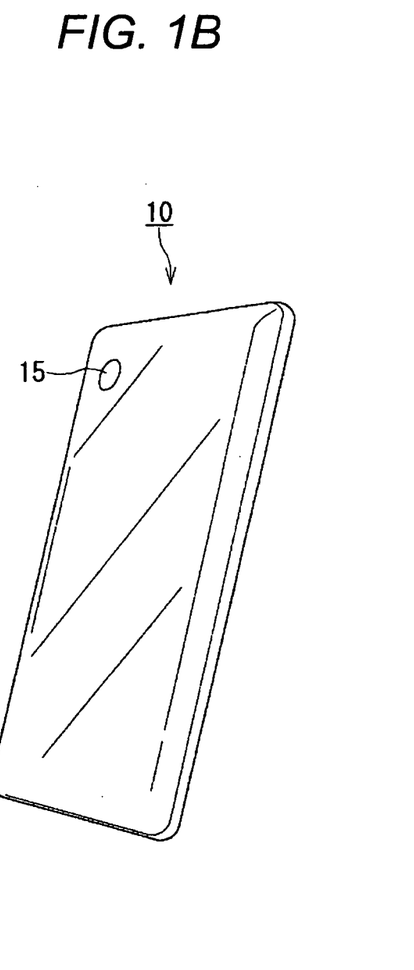
FIG. 1B is an exemplary rear perspective view of the mobile phone according to the embodiment.
Figure 2:
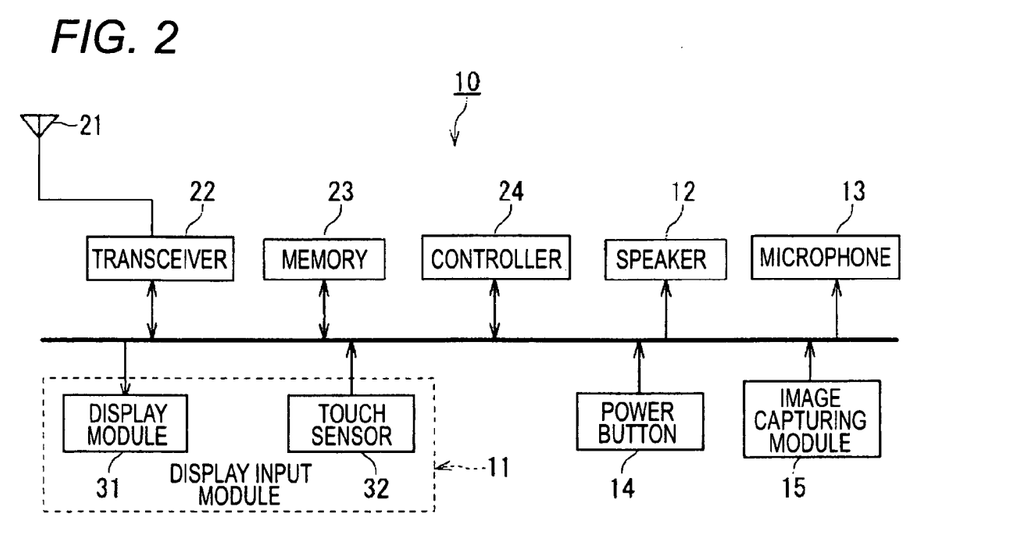
FIG. 2 is an exemplary functional block diagram of the mobile phone.

FIGS. 1A and 1B are schematic views showing external appearance of a mobile phone 10 according to an embodiment of the invention. That is, FIG. 1A is a front perspective view of the mobile phone 10, and FIG. 1B is a rear perspective view of the mobile phone 10. FIG. 2 is a functional block diagram of the mobile phone 10.

As shown in FIG. 1A, a display input module 11, a speaker 12 and a microphone 13 are provided in a front face of the mobile phone 10. A power button 14 is provided in a part of a side face of the mobile phone 10. As shown in FIG. 1B, an image capturing module 15 is provided in a rear face of the mobile phone 10.

As shown in FIG. 2, the mobile phone 10 further has an antenna 21, a transceiver 22, a memory 23, and a controller 24.

The display input module 11 is a so-called touch panel which has a display module 31, and a touch sensor 32 as an input module provided near the display module 31.

The display module 31 is made of a general display output device such as a liquid crystal display or an organic Electro Luminescence (EL) display. The display module 31 displays various information such as an image containing various kinds of character strings controlled by the controller 24.

The display module 31 controlled by the controller 24 displays information such as an image containing various kinds of character strings generated by a Web browser, an e-mail application program, a document creation application program or the like, information for operating the mobile phone 10 and keys (hereinafter referred to as soft keys) for operating the mobile phone 10.

The touch sensor 32 as an input module of the display input module 11 gives information of a position pointed on the touch sensor 32 by a user to the controller 24 of the mobile phone 10. When, for example, the user intends to do an operation of selecting a partial character string from character strings displayed on the display module 31, the user tries to touch the display screen and trace a desired character string. The touch sensor 32 acquires information from the touch operation as information of a position pointed by the operator and gives the information to the controller 24 of the mobile phone 10. When, for example, the display input module 11 is made of a resistance film type pressure-sensitive touch panel, the touch sensor 32 acquires information of a pressed position as information of a position pointed by the operator and gives the information to the controller 24 of the mobile phone 10.

The speaker 12 generates sound such as received voice corresponding to various kinds of information. The microphone 13 converts a user's voice input into an audio signal and transmits the audio signal.

When the power button 14 is pressed down by the user, a signal according to the press-down of the power button 14 is given to the controller 24. When the power button 14 is pressed down, the controller 24 can control the mobile phone 10 in accordance with a time period of from the press-down of the power button 14 to release of the power button 14. For example, the controller 24 performs a so-called 'clear' function when the power button 14 is pressed for a short time, turns on or off the power supply of the whole mobile phone 10 when the power button 14 is pressed for a long time, and resets the mobile phone 10 when the power button 14 is pressed for a very long time.

In the embodiment, the term 'pressed for a short time' means an operation of releasing the button in a time shorter than a first threshold time value (e.g. 1 sec) after the press-down of the button. The term 'pressed for a long time' means an operation of releasing the button after the press-down of the button continuously for a time not shorter than the first threshold time value. The term 'pressed for a very long time' means an operation of pressing down the button continuously for a time not shorter than a second threshold time value (e.g. 10 sec) larger than the first threshold time value. The clear function is a function provided popularly in the mobile phone 10 used generally. The clear function is a function of executing an operation such as erasing a character in the caret position when, for example, character input is being accepted, returning to a standby screen, terminating the application, etc. Incidentally, the position of the power button 14 is not limited to a side face of the mobile phone 10 if the power button 14 is located in a position where the user can operate the power button 14 easily.

The image capturing module 15 is made of a Charged Coupled Device (CCD) image sensor or a Complementary Metal Oxide Semiconductor (CMOS) image sensor. The image capturing module 15 captures an image around the mobile phone 10, generates a video signal and gives the video signal to the controller 24. The controller 24 creates an image based on the video signal received from the image capturing module 15 and displays the image on the display module 31.

The antenna 21 performs transmission/reception of communication electric wave to/from a wireless base station not shown. The transceiver 22 is a wireless circuit for transmitting/receiving a wireless signal included in the communication electric wave. The transceiver 22 modulates communication data output from the controller 24 and transmits the modulated communication data via the antenna 21. Further, the transceiver 22 demodulates communication data received via the antenna 21 and outputs the demodulated communication data to the controller 24. The communication data at least includes audio data required for communication, and data required for Internet communication.

The memory 23 is a nonvolatile memory which is data rewritable. Various kinds of data such as e-mail data, music data, etc. are stored in the memory 23.

The controller 24 is configured of a CPU, an RAM, an ROM, etc. The controller 24 controls the processing operation of the mobile phone 10 in accordance with programs stored in the ROM. The CPU loads a character string selection aid program stored in the ROM and data necessary for execution of the program into the RAM and executes processing in accordance with the character string selection aid program for aiding the user to select a character string easily and accurately.

The RAM provides a work area in which programs executed by the CPU and data necessary for the execution are temporarily stored.

The ROM stores a program for starting the mobile phone 10, the character string selection aid program and various kinds of data necessary for execution of these programs.

Incidentally, the ROM may have a configuration including a CPU-readable recording medium such as a magnetic or optical recording medium, a semiconductor memory, etc. Configuration may be made so that part or all of programs and data in the ROM can be downloaded via an electronic network.

Figure 3:
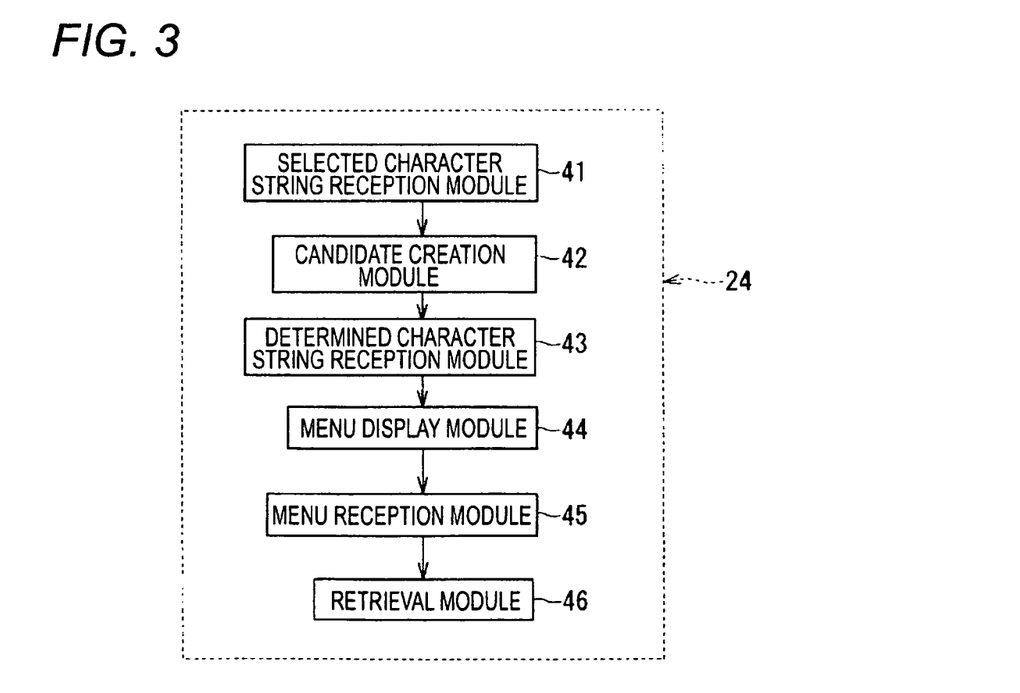
FIG. 3 is a schematic block diagram showing an example of configuration of functional modules achieved by a CPU of a controller depicted in FIG. 2.

FIG. 3 is a schematic block diagram showing an example of configuration of functional modules achieved by the CPU of the controller 24 depicted in FIG. 2. Incidentally, the function achievement module may be made of hardware logics such as circuits without use of the CPU.

The CPU at least functions as a selected character string reception module 41, a candidate creation module 42, a determined character string reception module 43, a menu display module 44, a menu reception module 45 and a retrieval module 46 based on the character string selection aid program. The respective modules 41 to 46 use required work areas of the RAM as storage areas for temporarily storing data.

The respective modules 41 to 46 of the CPU will be described below. The selected character string reception module 41 acquires information of a character string selected through the touch sensor 32 by the user (hereinafter referred to as 'temporarily selected character string') from character strings displayed on the display module 31 (hereinafter referred to as 'original character strings'). Incidentally, this embodiment will be described on the case where the user can select a desired character string from original character strings by tracing a desired character string on the touch sensor 32 with a user's finger.

Figure 4:
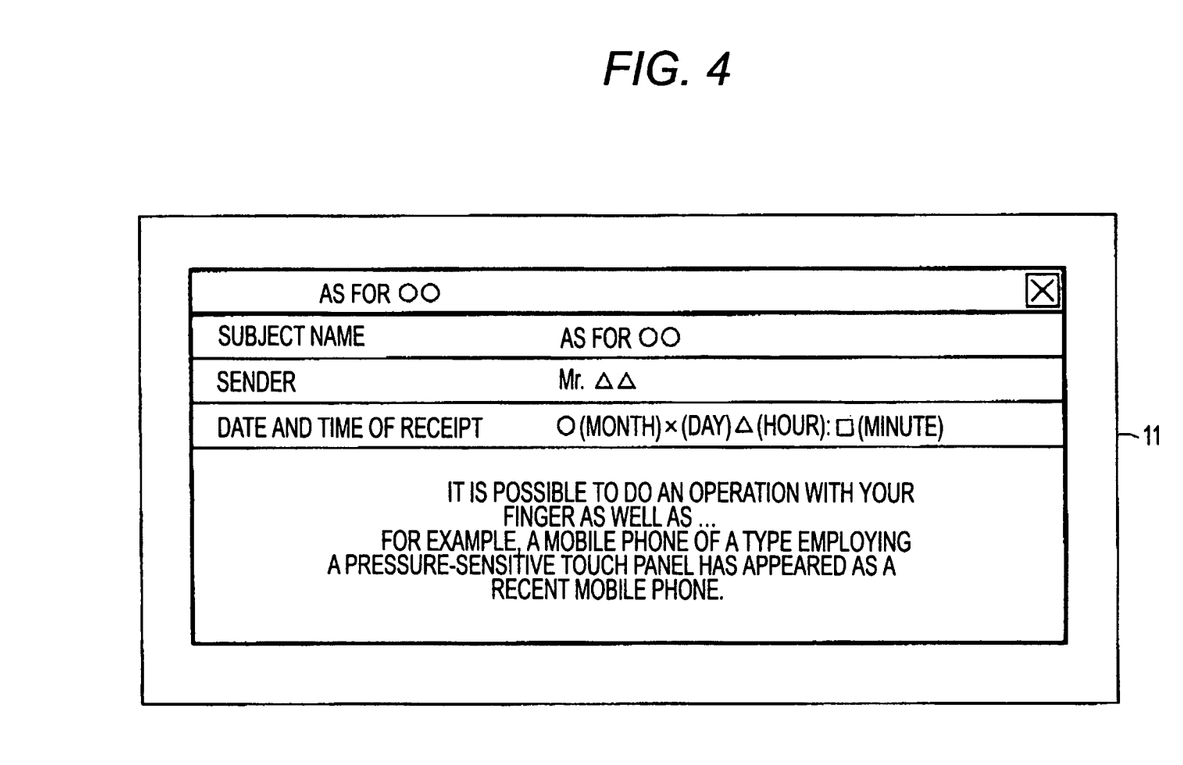
FIG. 4 is an explanatory view showing an example of a state in which information including original character strings is displayed on a display module of a display input module.

FIG. 4 is an explanatory view showing an example of a state in which information containing original character strings is displayed on the display module 31 of the display input module 11. FIG. 4 shows a state in which the original character strings are contained in an e-mail received by an e-mail application program (hereinafter referred to as 'mail application program') and the mail application program displays the e-mail on the display module 31.

When the display module 31 is small or when characters displayed are small though the display module 31 is large to some degree, it is difficult for the user to trace a character string with a user's finger accurately. For this reason, there is a possibility that information of a character string different from the character string desired by the user (hereinafter referred to as 'desired character string') may be acquired as a temporarily selected character string.

Figure 5:
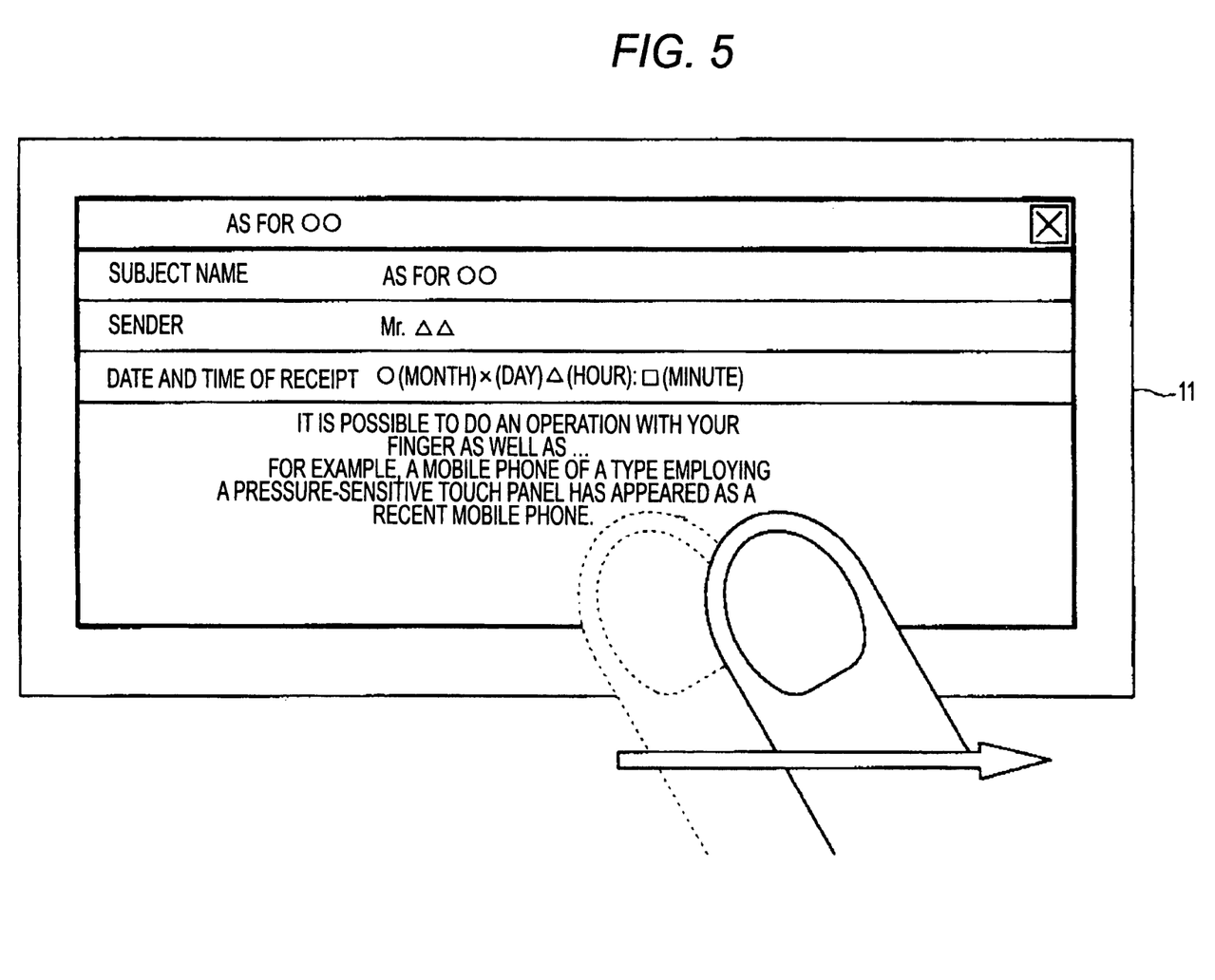
FIG. 5 is an explanatory view showing an example of a state in which a user selects a desired character string from original character strings by tracing the desired character string with a user's finger through a touch sensor.
Figure 6:
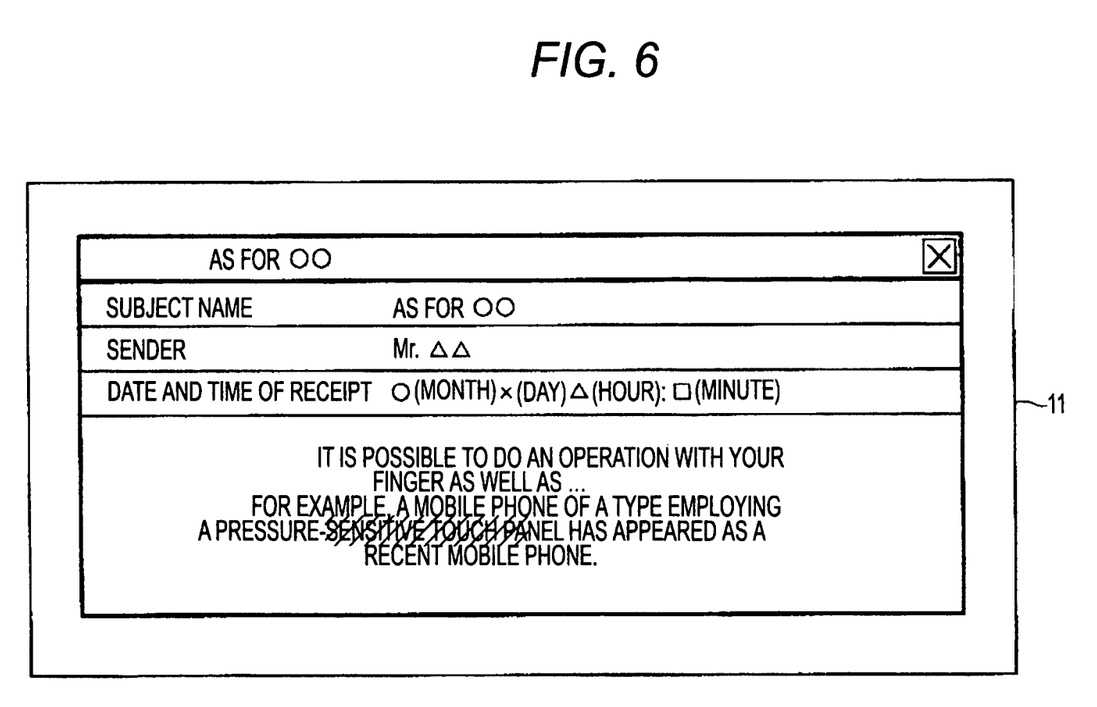
FIG. 6 is an explanatory view showing an example of a state in which a temporarily selected character string is selected from the original character strings.

FIG. 5 is an explanatory view showing an example of a state in which the user selects a desired character string from original character strings by tracing the desired character string on the touch sensor 32 with a user's finger. FIG. 6 is an explanatory view showing an example of a state in which a temporarily selected character string is selected from original character strings. In FIG. 6, the character string hatched with slant lines shows a character string (temporarily selected string) selected through the touch sensor 32 by the user.

Assuming that the user wants to perform information retrieval about a character string 'pressure-sensitive touch panel' and intends to select the character string, the user tries to select a desired character string by tracing the display place of 'pressure-sensitive touch panel' (desired character string) with a user's finger. It is however difficult for the user to trace the character string with a user's finger accurately when the display module 31 is small or when displayed characters are small though the display module 31 is large to some degree. Particularly start and endpoints of the character string are often displaced. FIG. 6 shows an example of a state in which a character string 'sensitive touch pa' is given as a temporarily selected character string to the selected character string reception module 41 though the user intends to select a character string 'pressure-sensitive touch panel'.

The mobile phone 10 according to this embodiment predicts occurrence of such displacement and aids the user to select a character string by predictively presenting candidates for a character string truly desired by the user (desired character string) based on information of a character string temporarily selected by the user.

The candidate creation module 42 creates character strings (hereinafter referred to as 'candidate character strings') relevant to the temporarily selected character string based on the information of the temporarily selected character string received from the selected character string reception module 41 and displays the candidate character strings on the display module 31. The candidate character strings are character strings as candidates for a character string (desired character string) desired by the user. Preferably, the candidate character strings may include the temporarily selected character string in consideration of the case where the temporarily selected character string coincides with the desired character string when the user performs accurate selection. The candidate character strings may include character strings having endings of words arranged to be suited, for example, to natural sentence search.

The candidate creation module 42 may create candidate character strings from only characters included in the temporarily selected character string. Alternatively, the candidate creation module 42 may create candidate character strings by using character strings included in original character strings in the vicinity of the temporarily selected character string. Alternatively, the candidate creation module 42 may create candidate character strings by using a dictionary stored in the memory 23 or a dictionary existing on the network.

Figure 7:
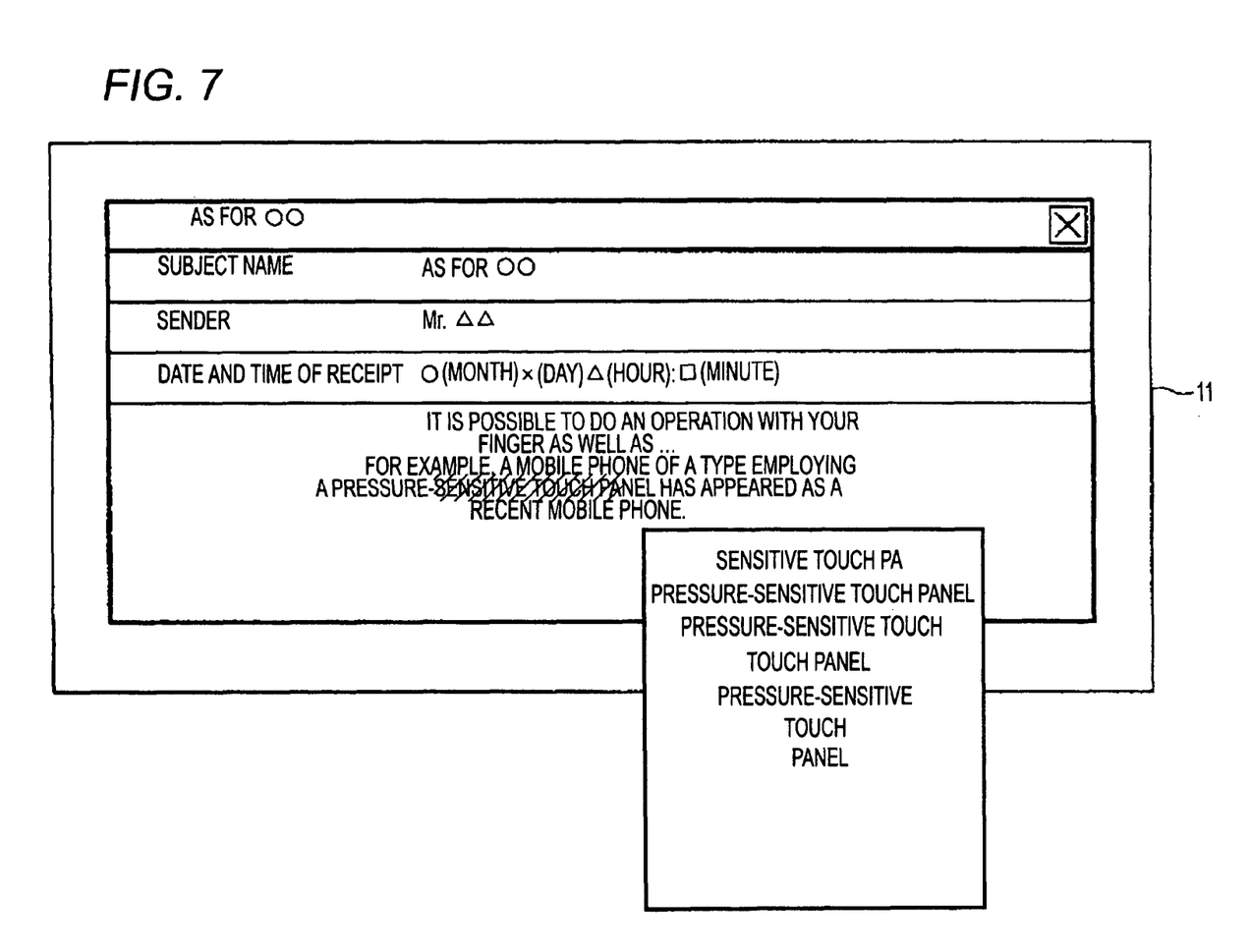
FIG. 7 is an explanatory view showing an example of a state in which candidate character strings are displayed.

FIG. 7 is an explanatory view showing an example of a state in which candidate character strings are displayed. FIG. 7 shows the case where the candidate creation module 42 creates candidate character strings by using character strings included in original character strings in the vicinity of the temporarily selected character string.

The candidate creation module 42 operates as shown in FIG. 7 to create candidate character strings by using character strings included in original character strings in the vicinity of the temporarily selected character string. That is, the candidate creation module 42 performs morphological analysis based on the information of the temporarily selected character string 'sensitive touch pa' in connection with character strings included in original character strings in the vicinity of the temporarily selected character string, create character strings such as 'sensitive touch pa', 'pressure-sensitive touch panel', 'pressure-sensitive touch', 'touch panel', 'pressure-sensitive', 'touch', etc. as candidate character strings and displays the candidate character strings on the display module 31.

Incidentally, when candidate character strings should be created from only characters included in the temporarily selected character string, the candidate creation module 42 creates character strings such as 'sensitive touch pa', 'sensitive touch', 'touch', etc. When candidate character strings should be created from a dictionary, the candidate creation module 42 separates the temporarily selected character string into 'sensitive' and 'touch pa' by morphological analysis, extracts 'light-sensitive', 'pressure-sensitive', 'temperature-sensitive', etc. from dictionary data matching with 'sensitive', extracts 'touch panel', 'touch pad', etc. from dictionary data matching with 'touch pa' and creates candidate character strings by combining these extracted words. When 'touch pa' is further separated into 'touch' and 'pa', the candidate creation module 42 may discard 'pa', extract 'touch switch', 'touch screen', etc. from dictionary data matching with 'touch' and use these words for creating candidate character strings.

On the other hand, when 'employing a pressure-sensitive touch panel has' is given as a temporarily selected character string and candidate character strings should be created from only characters included in the temporarily selected character string, the candidate creation module 42 can create character strings such as 'employing a pressure-sensitive touch panel has', 'employing a pressure-sensitive touch panel', 'pressure-sensitive touch panel', 'touch panel', etc. as candidate character strings based on the information of the temporarily selected character string and display the candidate character strings on the display module 31.

The candidate character strings created by the candidate creation module 42 can be expected to include the desired character string. Accordingly, the user can perform a rough operation for selecting a character string through the touch sensor 32. The user can select a desired character string accurately and easily by selecting the desired character string from candidate character strings created by the candidate creation module 42 based on the information of the temporarily selected character string selected by the rough operation.

The determined character string reception module 43 acquires information of a character string (hereinafter referred to as 'determined character string') determined by user's touching one of the candidate character strings through the touch sensor 32. When, for example, the user touches the display place of 'pressure-sensitive touch panel' with a user's finger on the occasion shown in FIG. 7, the determined character string reception module 43 acquires the character string 'pressure-sensitive touch panel' as a determined character string.

The menu display module 44 receives information indicating that information of the determined character string has been acquired, from the determined character string reception module 43 and displays an item set (hereinafter referred to as 'menu') presenting possible operations for the determined character string, on the display module 31. The menu includes at least one item indicating that information retrieval should be executed.

Figure 8:
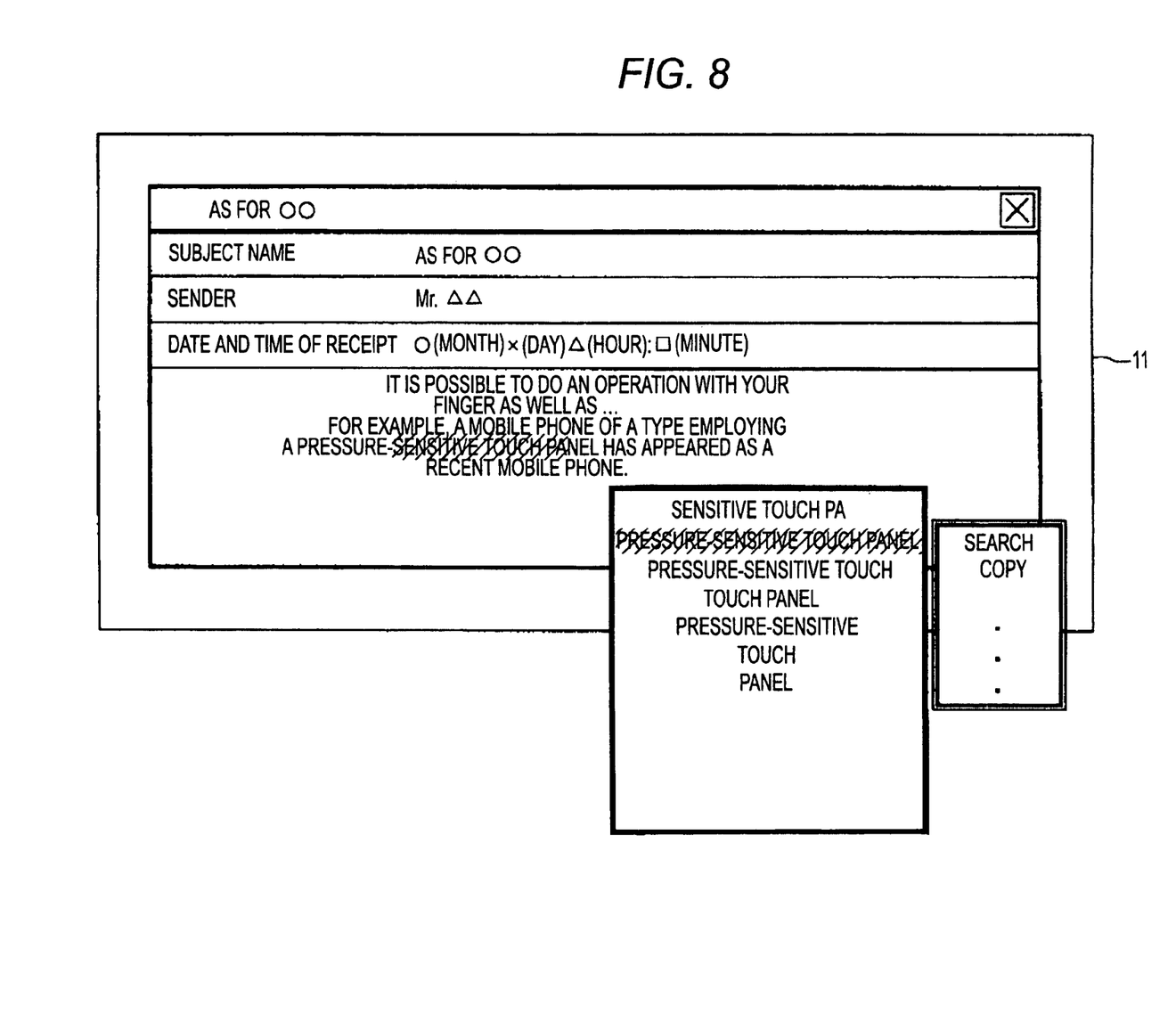
FIG. 8 is an explanatory view showing an example of a menu displayed with respect to a determined character string.

FIG. 8 is an explanatory view showing an example of a menu displayed with respect to the determined character string.

As shown in FIG. 8, the menu display module 44 displays items 'search' and 'copy' to thereby present possible operations 'search' and 'copy' for the determined character string to the user.

When the user selects 'search', the retrieval module 46 executes processing necessary for information retrieval. When the user selects 'copy', the controller 24 temporarily stores the determined character string in the RAM, the memory 23, etc.

Figure 9:
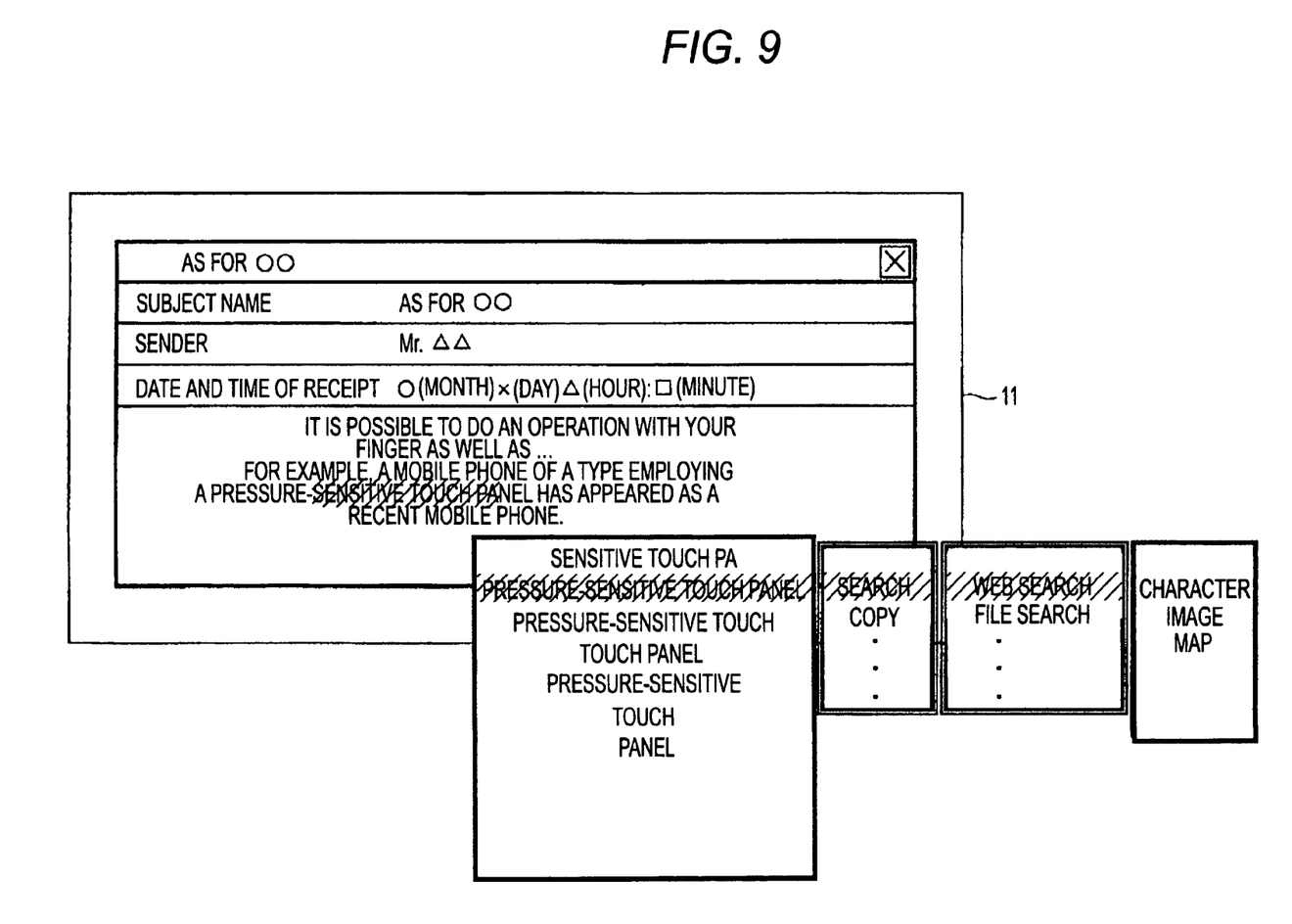
FIG. 9 is an explanatory view showing an example of a menu in the case where a retrieval module at least has a Web search function and a file search function and various search methods such as so-called character search, image search, etc. are allowed for the Web search function.

FIG. 9 is an explanatory view showing an example of the menu in the case where the retrieval module 46 at least has a Web search function and a file search function and various search methods such as so-called character search, image search, etc. are allowed for the Web search function.

With respect to information retrieval, assume that the mobile phone 10 has a so-called Web search and other search functions such as a file search function. As shown in FIG. 9, when the user selects 'search', the menu display module 44 can further display items such as 'Web search', 'file search', etc. Assume that various search methods such as so-called character search, image search, etc. are allowed for 'Web search' As shown in FIG. 9, when the user selects 'Web search', the menu display module 44 can further display items to lead the user to these search methods.

The menu reception module 45 accepts information of an item selected by user's touching the item through the touch sensor 32. When an item concerned with retrieval is selected, the menu reception module 45 gives information of the selected item and information of the determined character string to the retrieval module 46.

Upon reception of the selected item from the menu reception module 45, the retrieval module 46 executes processing corresponding to the selected item. For example, upon reception of information indicating the item indicating the fact that character search should be executed is selected in Web search, the retrieval module 46 performs processing necessary for character search in Web search. The processing will be described more specifically on the example shown in FIG. 9. Upon reception of information indicating that 'character' in 'Web search' is selected, the retrieval module 46 first determines whether the Web browser is active or not. When the Web browser is not active, the retrieval module 46 starts the Web browser to acquire contents of an external information retrieval Web page through the network. Then, the retrieval module 46 executes character search for the determined character string by using the Web page and displays an image of the Web page acquired as a result of the character search on the display module 31.

On the other hand, upon reception of information indicating that 'file search' is selected, the retrieval module 46 retrieves data containing character strings matching with the determined character string, for example, from data stored in the memory 23 of the mobile phone 10. In this case, the retrieval module 46 operates as follows specifically. Upon reception of information indicating that 'file search' is selected, the retrieval module 46 determines whether the program used for file search is active or not. When the program is not active, the retrieval module 46 starts the program used for file search, executes file search for the determined character string by using the program and displays an image as a result of the file search on the display module 31.

An example of the operation of the mobile phone 10 according to this embodiment will be described below.

Figure 10:
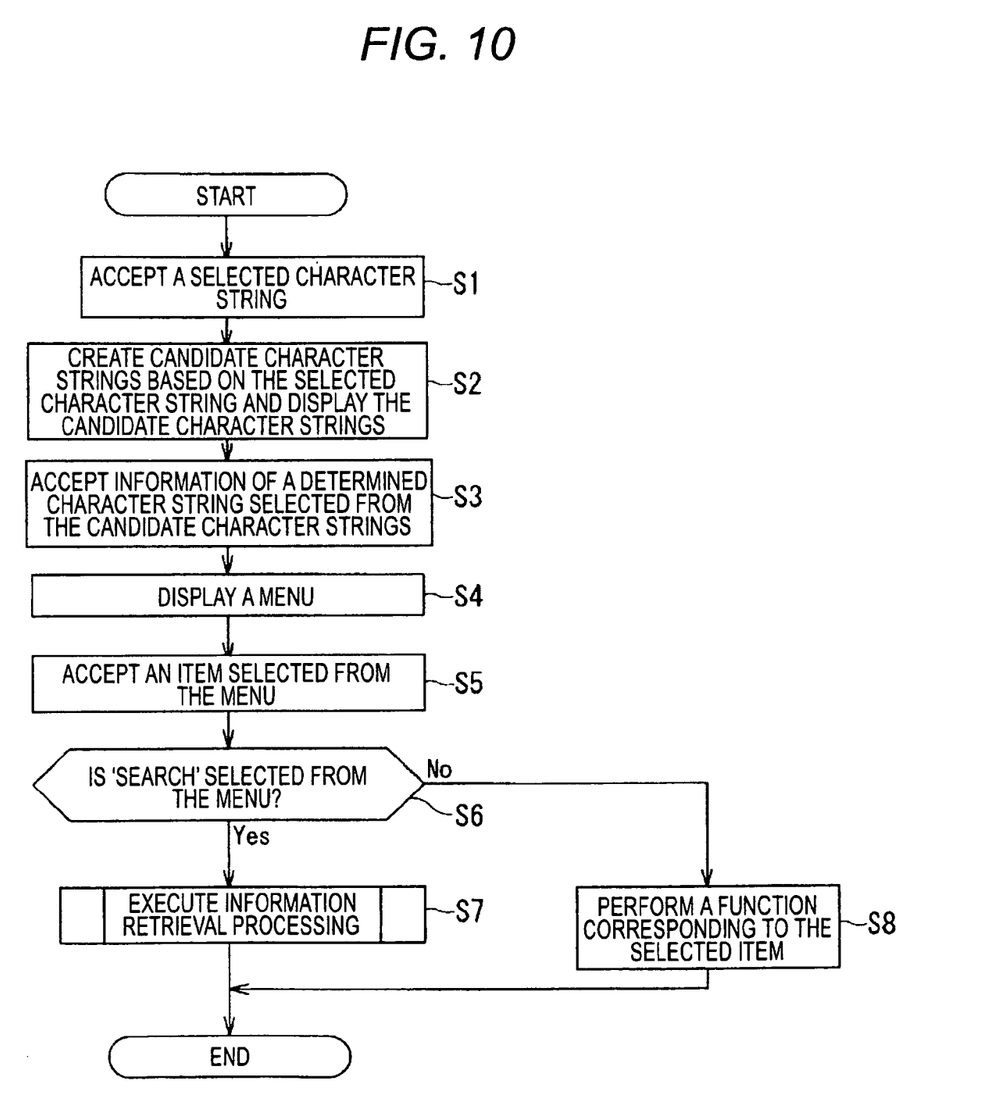
FIG. 10 is an exemplary flow chart showing a procedure when the CPU of the mobile phone depicted in FIGS. 1A and 1B executes processing for aiding the user to select a desired character string easily and accurately.

FIG. 10 is a flow chart showing a procedure in the case where the CPU of the mobile phone 10 depicted in FIGS. 1A and 1B executes processing for aiding the user to select a desired character string easily and accurately. In FIG. 10, the reference number attached to 'S' shows each step in the flow chart.

This procedure starts when information including original character strings is displayed on the display module 31. Incidentally, description will be made as follows on the case where information including original character strings is contained in an e-mail received by the e-mail application program (mail application) and the mail application is started to display the received e-mail on the display module 31 (see FIG. 4).

First, in step S1, the selected character string reception module 41 acquires information of a temporarily selected character string which is selected through the touch sensor 32 by the user from original character strings displayed on the display module 31. On this occasion, the user traces a character string to be selected from character strings displayed on the display module 31 with a user's finger to thereby give information of the character string to be selected to the selected character string reception module 41. When, for example, the user actually traces only 'sensitive touch pa' with a user's finger from the original character strings shown in FIG. 4 (see FIG. 5) though 'pressure-sensitive touch panel' is truly desired as the desired character string by the user, the selected character string reception module 41 acquires 'sensitive touch pa' as a temporarily selected character string (see FIG. 6).

Then, in step S2, the candidate creation module 42 creates candidates for a character string truly desired by the user (candidate character strings) based on information of the temporarily selected character string received from the selected character string reception module 41 and displays the candidate character strings on the display module 31. When, for example, the candidate creation module 42 uses character strings included in original character strings in the vicinity of the temporarily selected character string for creating candidate character strings, the candidate creation module 42 performs morphological analysis based on information of the temporarily selected character string 'sensitive touch pa' in connection with character strings included in original character strings in the vicinity of the temporarily selected character string, creates candidate character strings such as 'sensitive touch pa', 'pressure-sensitive touch panel' 'pressure-sensitive touch', 'touch panel', 'pressure-sensitive', 'touch' and 'panel' and displays the candidate character strings on the display module 31 (see FIG. 7).

Then, in step S3, the determined character string reception module 43 acquires information of a determined character string. The determined character string is selected by user's touching one of the candidate character strings through the touch sensor 32.

Then, in step S4, the menu display module 44 receives information indicating the fact that the information of the determined character string has been acquired, from the determined character string reception module 43 and displays a menu presenting possible operations for the determined character string to the user on the display module 31. As shown in FIG. 8, the menu contains at least one item indicating that information retrieval should be executed (the item 'search' in the example shown in FIG. 8).

Then, in step S5, the menu reception module 45 accepts information of the item selected by user's touching through the touch sensor 32.

Then, in step S6, the menu reception module 45 determines whether the selected item is an item concerned with retrieval or not. When the selected item is an item concerned with retrieval, the menu reception module 45 gives information indicating a result of the determination and information indicating the determined character string to the retrieval module 46 and then the current location of processing goes to step S7. On the other hand, when the selected item is not an item concerned with retrieval, the current location of processing goes to step S8.

Then, in step S7, the retrieval module 46 performs information retrieval processing based on the information of the determined character string and displays a result of the information retrieval on the display module 31. Then, the series of procedures is terminated.

On the other hand, in step S8, the controller 24 receives the information of the selected item and the information of the determined character string from the menu reception module 45 and achieves a function corresponding to the selected item. Then, the series of procedures is terminated. When, for example, 'copy' is selected in the example shown in FIG. 8, the controller 24 temporarily stores the determined character string in the RAM, the memory 23, etc.

By the aforementioned procedure, the mobile phone 10 can aid the user to select a desired character string easily and accurately.

Figure 11:
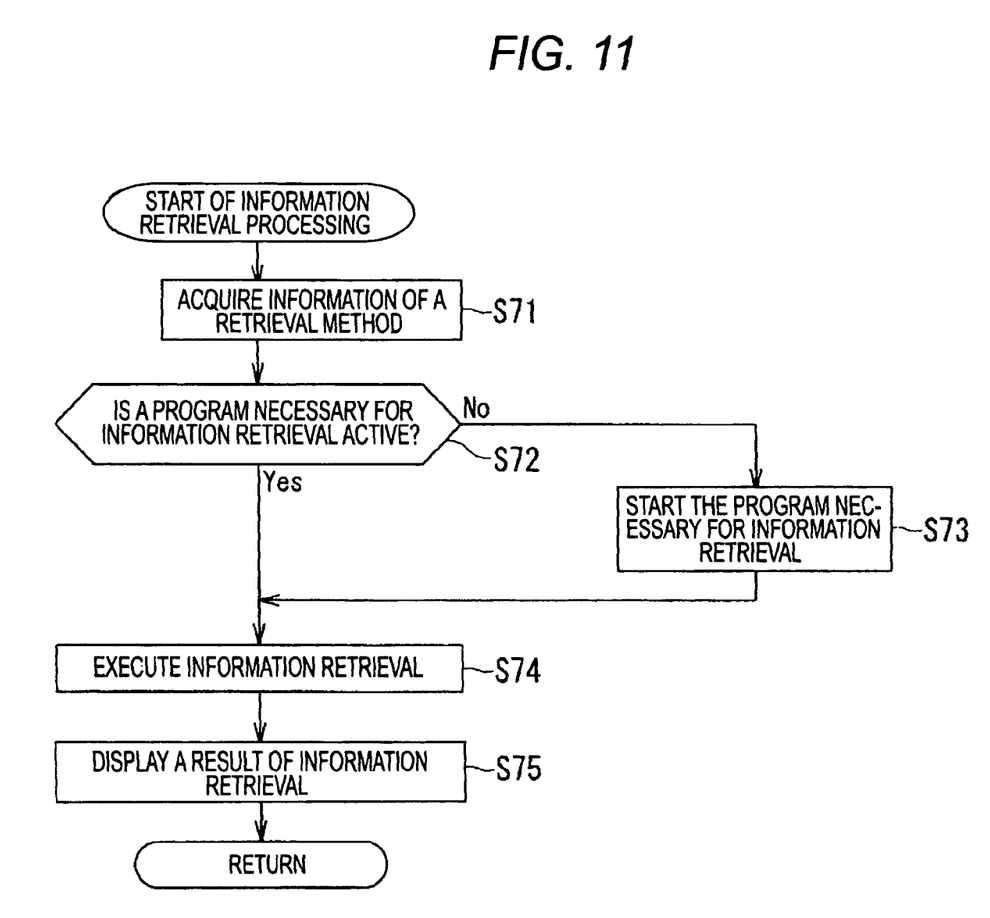
FIG. 11 is an exemplary sub-routine flow chart showing a procedure of information retrieval processing executed by the controller in step S7 in FIG. 10.

A procedure of information retrieval based on information of the determined character string will be described below. FIG. 11 is a sub-routine flow chart showing a procedure of information retrieval processing executed by the controller 24 in step S7 in FIG. 10. In FIG. 11, the reference number attached to 'S' shows each step in the flow chart.

Description will be made as follows on the case where the retrieval module 46 has both a Web search function and a file search function and various search methods such as so-called character search, image search, etc. are allowed for the Web search function as shown in FIG. 9.

In step S71, the menu reception module 45 acquires information indicating the type of information retrieval to determine a program for information retrieval and a retrieval method. In the example shown in FIG. 9, the menu reception module 45 acquires information of an item selected from 'Web search' and 'file search' as information indicating the type of information retrieval. In the example shown in FIG. 9, the menu reception module 45 further acquires information of an item selected from retrieval method items such as character search, image search, etc. when 'Web search' is selected.

Then, in step S72, the retrieval module 46 receives the information indicating the type of information retrieval from the menu reception module 45 and determines whether a program necessary for this type information retrieval is active or not. When, for example, 'Web search' is selected as the type of information retrieval, the retrieval module 46 determines whether a Web browser is active or not. When, for example, 'file search' is selected as the type of information retrieval, the retrieval module 46 determines whether a program used for file search is active or not. When such a program is not active, the current location of processing goes to step S73. On the other hand, when such a program is active, the current location of processing goes to step S74.

Then, in step S73, the retrieval module 46 starts a program necessary for information retrieval.

Then, in step S74, the retrieval module 46 performs information retrieval based on the information of the determined character string by using the program necessary for information retrieval. For example, upon reception of information indicating that the item indicating the fact where character search should be executed in Web search has been selected, from the menu reception module 45, the retrieval module 46 operates the Web browser to acquire contents of an external information retrieval Web page through the network and executes character search for the determined character string by using the Web page. For example, upon reception of information indicating that the item indicating the fact that file search should be executed has been selected, from the menu reception module 45, the retrieval module 46 executes file search for the determined character string by using the program used for file search.

Then, in step S75, the retrieval module 46 displays a result of the information retrieval on the display module 31 and then processing in step S7 in FIG. 10 is terminated.

By the aforementioned procedure, information retrieval can be performed based on the information of the determined character string.

The mobile phone 10 according to this embodiment predictively presents candidates for a character string (desired character string) truly desired by the user based on information of a character string selected by the user. Accordingly, the user can select a desired character string from the candidate character strings even when a character string different from the desired character string was selected because of a user's wrong operation in selecting a character string through the touch sensor 32. Hence, in the mobile phone 10 according to this embodiment, the user can make a rough operation for selecting a character string through the touch sensor 32 and can select a desired character string from candidate character strings created based on the character string selected by the rough operation. Consequently, the user can select the desired character string accurately and easily.

The mobile phone 10 according to this embodiment automatically starts a program necessary for information retrieval to display a result of the information retrieval if there is an instruction to perform information retrieval of a character string when the character string is selected. Hence, in the mobile phone 10 according to this embodiment, the user can perform information retrieval of a desired character string very easily while extracting the desired character string accurately and easily by a simple operation of roughly selecting a character string.

The invention is not limited to the aforementioned embodiment itself and may be embodied by modification of constituent members without departing from the gist of the invention in practical use. Constituent members disclosed in the aforementioned embodiment may be used in suitable combination to form various inventions. For example, several constituent members may be omitted from all constituent members disclosed in the embodiment.

Although this embodiment has been described on the case where the input module is a touch sensor, another pointing device such as a mouse may be used in place of the touch sensor as the input device if the input device is formed so that a character string can be selected from character strings displayed on the display module.

The invention can be applied not only to the mobile phone described in this embodiment also to any type portable information processing apparatus. For example, the invention can be applied to a portable information processing apparatus such as a PDA (Personal Digital Assistant), a portable game machine, a portable music player, a portable motion picture player, etc. The invention is particularly preferably adapted to a portable information processing apparatus having a small-size display module.

Although the embodiment of the invention has been described on the case where the steps in each flow chart are processed sequentially in the described order, it is not necessary to process the steps sequentially and the invention may include the case where the steps are processed in parallel or individually.

What is claimed is:

1. An information processing apparatus including a processor and a non-transitory memory, the information processing apparatus comprising:
a first reception module configured to acquire first information indicative of a character string selected through an input module from text displayed on a display module, the character string being selected from a different position in the text than a position of a character string intended by the user to be selected due to a positional error occurring when the user operates the input module;
a candidate creation module configured to create a plurality of character strings relevant to the selected character string as candidates based on the first information and to display the candidates on the display module, the plurality of character strings being candidate character strings including at least one character string that is generated by performing morphological analysis, based on the selected character string as well as text data preceding and following the selected character string in the text, to estimate the character string intended by the user to be selected, the displayed text containing respective character strings identical to the displayed candidates;
a second reception module configured to acquire second information indicative of a character string that is selected from the candidates by the user through the input module; and
a retrieval module configured to:
receive the second information from the second reception module;
perform a search based on the second information; and
display a result of the search on the display module.

2. The information processing apparatus of claim 1, wherein the retrieval module is configured to:
automatically start a program necessary for the information retrieval when receiving the second information from the second reception module;
perform the information retrieval based on the second information by using the program; and
display a result of the information retrieval on the display module.

3. The information processing apparatus of claim 2, wherein:
the information retrieval includes a web-based search on a network for information on a network; and
the retrieval module automatically starts a browser necessary for the information retrieval when receiving the second information from the second reception module, performs the web-based search for the second information and displays an image of a result of the information retrieval on the display module.

4. The information processing apparatus of claim 3, further comprising:
a menu display module configured to display on the display module a plurality of items including an item indicating that information retrieval is to be performed when the character string is determined through the input module; and
a menu reception module configured to notify the retrieval module of third information that the item is selected through the input module from the plurality of items,
wherein the retrieval module performs information retrieval based on the second information when the second information is received from the second reception module and the third information is received from the menu reception module.

5. The information processing apparatus of claim 4, wherein the candidate creation module is configured to create a reference character string by adding at least one character prior to or subsequent to the selected character string and to create the plurality of character strings as the candidates based on the reference character string.

6. The information processing apparatus of claim 3, wherein the candidate creation module is configured to create a reference character string by adding at least one character prior to or subsequent to the selected character string and to create the plurality of character strings as the candidates based on the reference character string.

7. The information processing apparatus of claim 2, further comprising:
a menu display module configured to display on the display module a plurality of items including an item indicating that information retrieval is to be performed when the character string is determined through the input module; and
a menu reception module configured to notify the retrieval module of third information that the item is selected through the input module from the plurality of items,
wherein the retrieval module performs information retrieval based on the second information when the second information is received from the second reception module and the third information is received from the menu reception module.

8. The information processing apparatus of claim 7, wherein the candidate creation module is configured to create a reference character string by adding at least one character prior to or subsequent to the selected character string and to create the plurality of character strings as the candidates based on the reference character string.

9. The information processing apparatus of claim 2, wherein the candidate creation module is configured to create a reference character string by adding at least one character prior to or subsequent to the selected character string and to create the plurality of character strings as the candidates based on the reference character string.

10. The information processing apparatus of claim 1, further comprising:
a menu display module configured to display on the display module a plurality of items including an item indicating that information retrieval is to be performed when the character string is determined through the input module; and
a menu reception module configured to notify the retrieval module of third information that the item is selected through the input module from the plurality of items,
wherein the retrieval module performs information retrieval based on the second information when the second information is received from the second reception module and the third information is received from the menu reception module.

11. The information processing apparatus of claim 10, wherein the candidate creation module is configured to create a reference character string by adding at least one character prior to or subsequent to the selected character string and to create the plurality of character strings as the candidates based on the reference character string.

12. The information processing apparatus of claim 1, wherein the candidate creation module is configured to create a reference character string by adding at least one character prior to or subsequent to the selected character string and to create the plurality of character strings as the candidates based on the reference character string.

13. The information processing apparatus of claim 1, further comprising a touch panel configured to display the character strings and to select the character string there through.

14. A mobile phone including a processor and a non-transitory memory, the mobile phone comprising:
a first reception module configured to acquire first information indicative of a character string selected by a user through an input module from text displayed on a display module, the character string being selected from a different position in the text than a position of a character string intended by the user to be selected due to a positional error occurring when the user operates the input module;
a candidate creation module configured to create a plurality of character strings relevant to the selected character string as candidates based on the first information and to display the candidates on the display module, the plurality of character strings being candidate character strings including at least one character string that is generated by performing morphological analysis, based on the selected character string as well as text data preceding and following the selected character string in the text, to estimate the character string intended by the user to be selected, the displayed text containing respective character strings identical to the displayed candidates; and
a second reception module configured to acquire second information of a character string determined through the input module from the candidates by the user through the input module; and
a retrieval module configured to:
receive the second information from the second reception module;
perform a search based on the second information; and
display a result of the search on the display module.

* * * * *